United States Patent
Hughes

[11] 3,777,857
[45] Dec. 11, 1973

[54] HYDRAULIC BRAKING SYSTEM FOR VEHICLES
[75] Inventor: Michael James Hughes, Lichfield, England
[73] Assignee: Girling Limited, Birmingham, England
[22] Filed: July 29, 1971
[21] Appl. No.: 167,094

[30] Foreign Application Priority Data
Aug. 8, 1970   Great Britain.................. 38,310/70

[52] U.S. Cl............. 188/170, 60/581, 188/106 P, 188/345
[51] Int. Cl............................................ F16d 65/24
[58] Field of Search................... 188/345, 170, 343, 188/106 P, 170; 303/9; 60/54.6 M, 54.5 E, 54.6 E

[56] References Cited
UNITED STATES PATENTS

| | | | |
|---|---|---|---|
| 3,453,030 | 7/1969 | Cumming............................ | 303/9 X |
| 3,478,847 | 11/1969 | Bender et al................... | 188/106 P |
| 3,260,331 | 7/1966 | Borman, Jr..................... | 188/170 X |
| 3,633,715 | 1/1972 | Burnett........................... | 188/106 P |

*Primary Examiner*—George E. A. Halvosa
*Attorney*—Scrivener, Parker, Scrivener & Clarke

[57] ABSTRACT

In a fluid-pressure operated braking system for vehicles incorporating internal shoe-drum brakes the brake shoes are separated to apply the brake by a wedge actuated by pistons arranged in tandem in a cylinder and individually acted upon by pressure fluid derived from separate sources under manual control.

4 Claims, 6 Drawing Figures

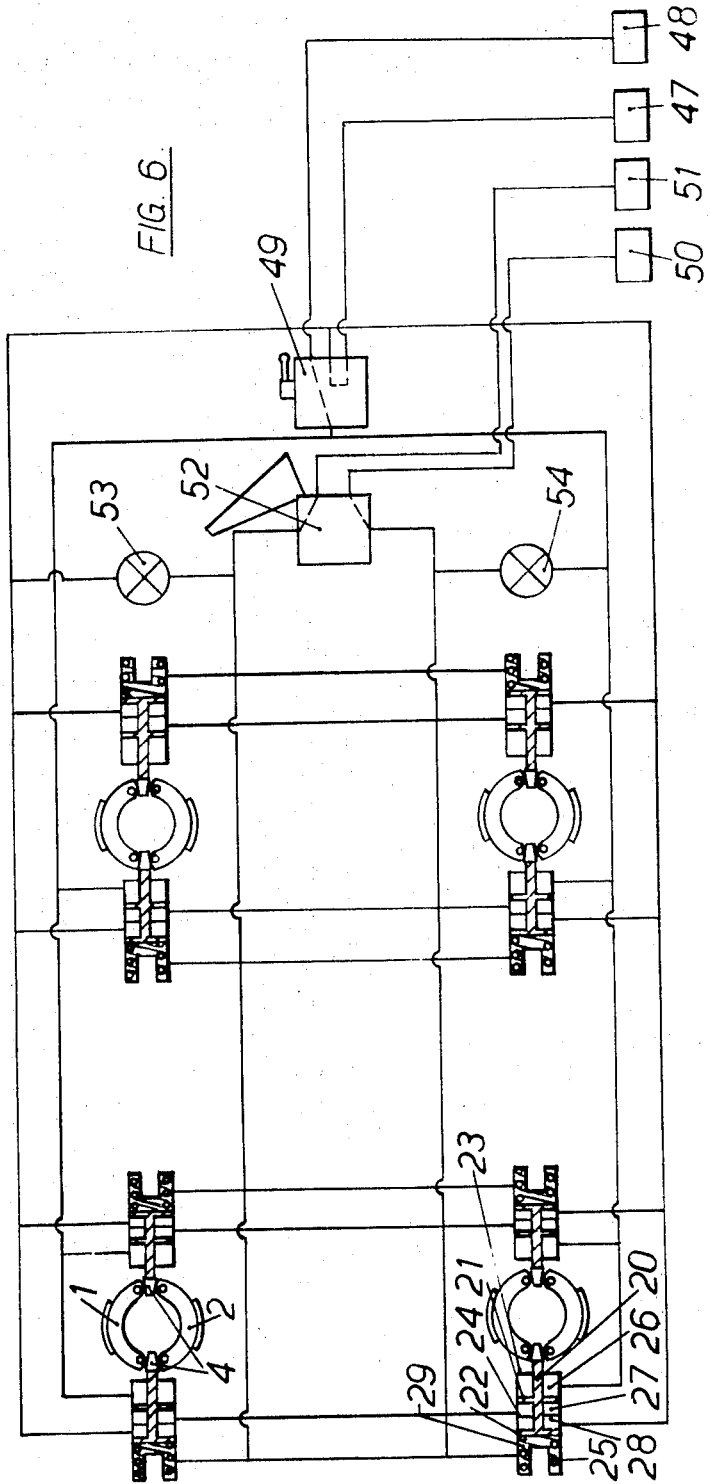

HYDRAULIC BRAKING SYSTEM FOR VEHICLES

This invention relates to hydraulically operated braking systems for vehicles.

A fluid-pressure-operated braking system according to our invention incorporates shoe-drum brakes in which the shoes are separated at one or each end to apply the brake by a wedge actuated by two pistons arranged in tandem in a cylinder and individually acted upon by pressure fluid from two independent sources under manual control.

The shoes are applied for normal service braking by fluid pressure acting on both pistons, and if the pressure fluid supply acting on either piston should fail the brake will still be applied by fluid from the other source acting on the other piston.

If application of the brake by further non-fluid-pressure means is required, as for example in rear wheel brakes, a third piston may be provided in the cylinder, this piston being spring-loaded in a direction to apply the brake and being normally held inoperative by fluid pressure derived from at least one other source under separate control.

Where a third spring-loaded piston is incorporated the brake will be applied by that piston on release of the fluid pressure normally holding the spring inoperative. This is the actuating means normally employed for parking, but it can be used for applying the brake in an emergency caused by failure of both of the other fluid pressure sources.

Actuators incorporating third spring-loaded pistons may be provided for the brakes on one pair of wheels only of a four-wheeled vehicle for parking and may be employed for separating the shoes at one or both ends.

Some embodiments of our invention are illustrated diagrammatically in the accompanying drawings in which.

Figure 1:
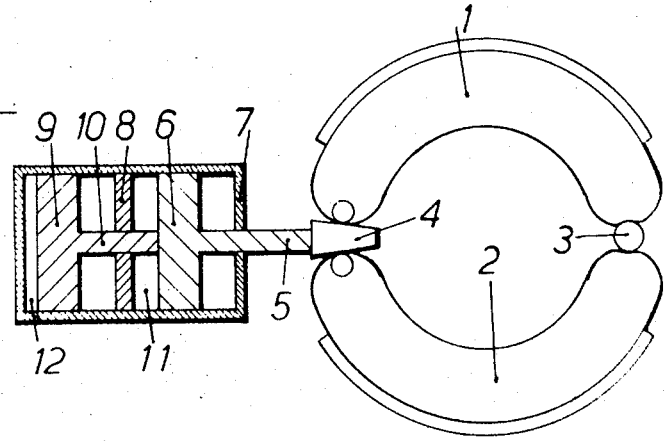
FIG. 1 is a diagram showing a shoe-drum brake in which the shoes are separated at one end by two pistons arranged in tandem in an hydraulic cylinder.

In the arrangement shown in FIG. 1 two arcuate brake shoes 1, 2 are adapted to fulcrum at one end on a common anchor pin 3. The other ends of the shoes are separated to apply the brake by a wedge 4 actuated by a piston-rod 5 of a piston 6 working in an hydraulic cylinder 7, the piston-rod working through a seal in the inner end of the cylinder. The space between the piston 6 and the closed outer end of the cylinder is divided by a partition 8, and a piston 9 working in the cylinder on the outer side of the partition is integral with or secured to a piston-rod 10 working through a seal in the partition 8 and adapted to bear on the outer end of the piston 6.

Normally, to apply the brake, fluid under pressure derived from separate sources is supplied to the space 11 between the piston 6 and the partition 8 and to the space 12 between the piston 9 and the closed outer end of the cylinder. Both pistons are then operative to actuate the wedge and apply the brake. If either source of pressure fluid should fail one piston will be inoperative but the brake can still be applied by pressure fluid from the other source acting on the other piston.

Figure 2:
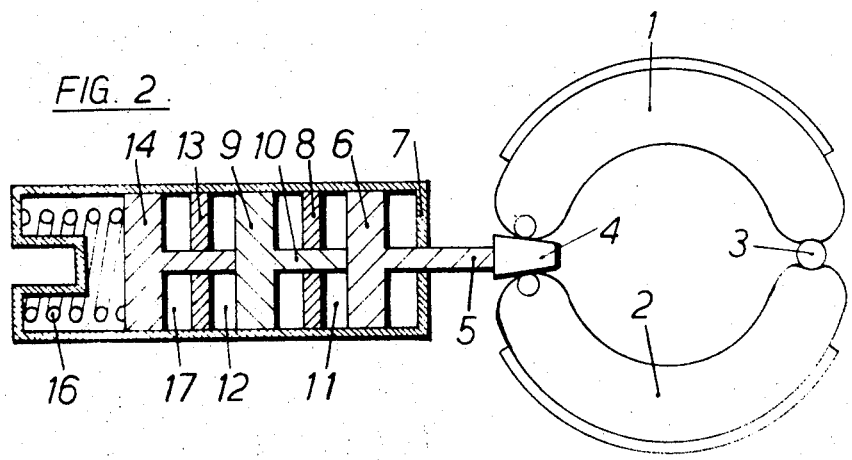
FIG. 2 is a similar diagram showing a cylinder incorporating a third spring-loaded piston.

In the modification shown in FIG. 2, the outer end of the cylinder is extended beyond the outer piston 9 and is divided by a partition 13 which takes the place of the closed outer end of the cylinder in the first embodiment. A third piston 14 works in the cylinder on the outer side of the partition and has a piston-rod 15 which works through and is in sealing engagement with the partition 13, the free end of the piston-rod being adapted to bear on the outer end of the piston 9. The piston 14 is loaded by a compression spring 16 located between the piston and the closed outer end of the cylinder and acting on the piston in a direction to apply the brake.

In this embodiment there is a further space 17 in the cylinder between the piston 15 and the partition 14.

In the normal off position of the brake the spring is held compressed by pressure fluid supplied to the space 17 and acting on the piston 14.

The brake is applied in the same way as in the first embodiment by admitting pressure fluid from separate sources to the spaces 11 and 12 and acting on the pistons 6 and 9.

If both of these sources should fail the supply of pressure fluid to the space 17 can be cut off and the brake will then be applied by the spring 16, the piston 14 acting through the pistons 9 and 6 on the wedge. Release of the pressure in the space 17 also allows the brake to be applied by the spring for parking.

Figure 3:
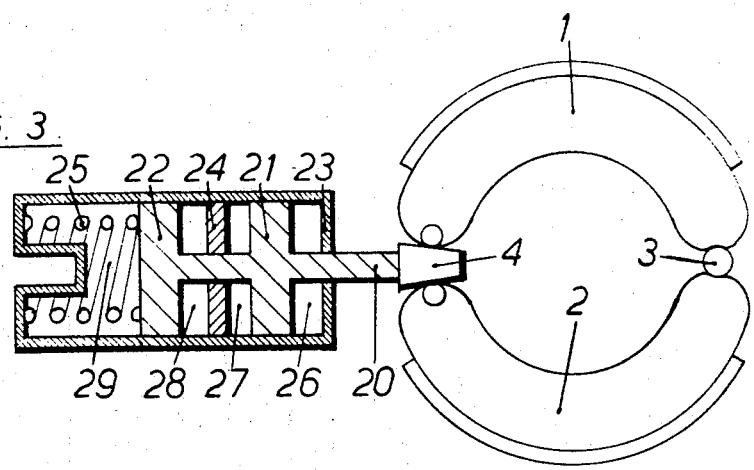
FIG. 3 is a similar diagram showing a cylinder incorporating two pistons on a common piston-rod.

In the embodiment shown in FIG. 3 shoes 1, 2 are separated at one end by a wedge 4 as in the first two embodiments, but the wedge is actuated by a piston-rod 20 carrying two axially spaced pistons 21, 22 working in a cylinder 23 on opposite sides of a partition 24 through which the piston-rod passes and with which it is in sealing and sliding engagement. The piston-rod and piston assembly is loaded by a compression spring 25 located between the piston 22 and the closed outer end of the cylinder and acting on the assembly in a direction to apply the brake.

There are four separate pressure spaces in the cylinder, namely, the space 26 between the piston 21 and the inner end of the cylinder, the space 27 between the piston 21 and the partition 24, the space 28 between the piston 22 and the partition, and the space 29 between the piston 22 and the closed rear end of the cylinder.

During normal running of the vehicle pressure is maintained in the spaces 26 and 28 to urge the piston-rod and piston assembly outwardly and hold the spring 25 compressed, the supply of pressure fluid to these spaces being derived from two separate sources.

For normal service braking fluid under pressure is supplied from two further separate sources to the spaces 27 and 29 to urge tbe piston-rod and piston assembly inwardly to apply the brake, the spaces 26 and 28 being simultaneously exhausted to a reservoir at atmospheric pressure so that the spring 25 assists in the application of the brake.

For parking or emergency braking the supply of fluid to the spaces 26 and 28 is cut off and these spaces are connected to the reservoir so that the spring urges the piston-rod and piston assembly inwardly to apply the brake and hold it applied until the spaces 26 and 28 are again pressurised to release the brake.

Figure 4:
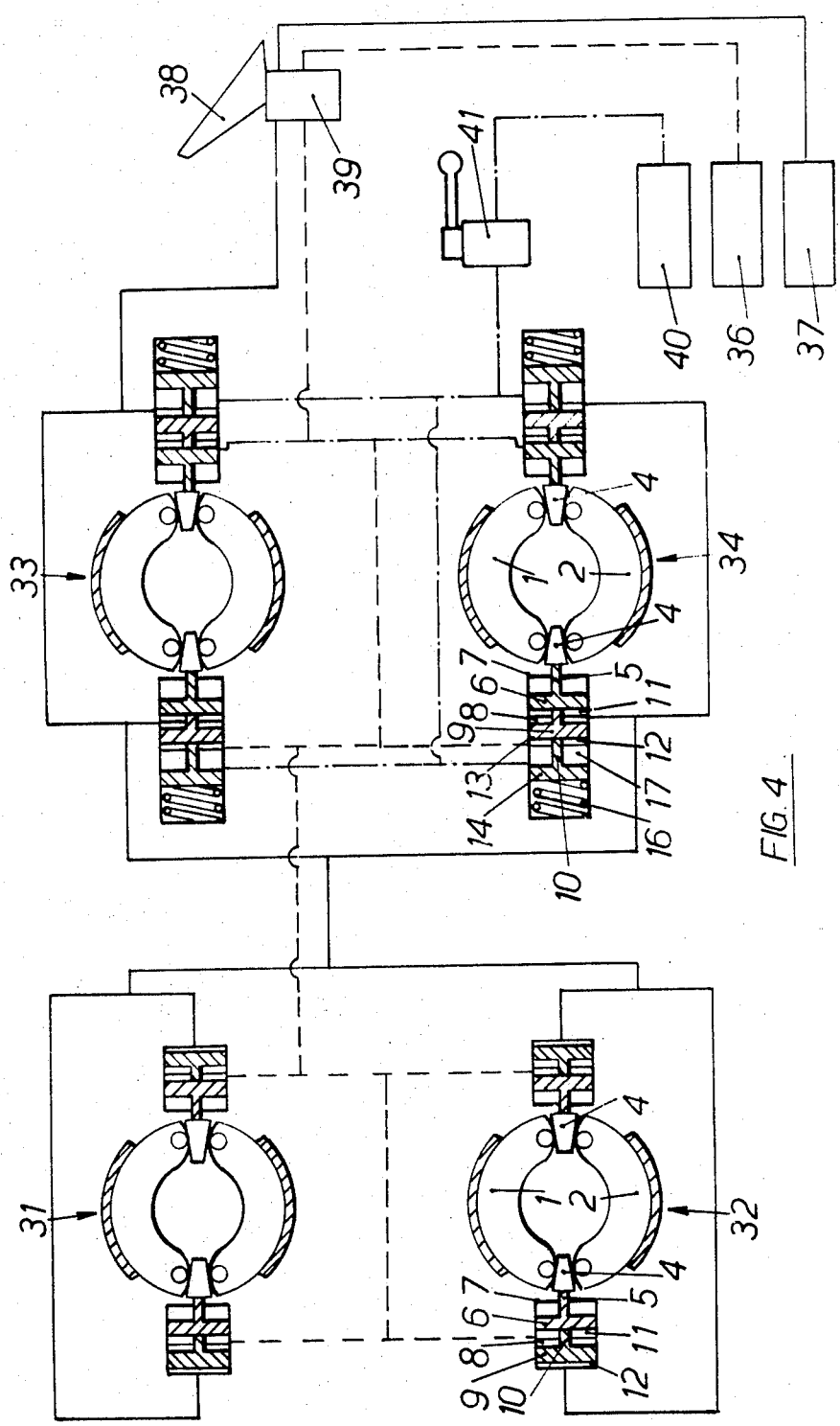
FIG. 4 is a layout of a complete braking system incorporating actuators for the brake shoes as shown in FIGS. 1 and 2.

A complete braking system incorporating actuators as described above with reference to FIGS. 1 and 2 is illustrated in FIG. 4.

In this system shoe-drum brakes 31, 32 on the front wheels of a vehicle incorporate shoes adapted to be separated at both ends by wedges and hydraulic actuators as shown in FIG. 1. The rear wheel brakes 33, 34, which to comply with the law must have independent means for applying them for parking or in an emergency, are actuated by means as shown in FIG. 2.

For normal service application of the brakes fluid under pressure is supplied to the spaces 11 and 12 of the cylinders for the brakes on both front and rear wheels, the fluid supplied to these spaces being derived from separate pressure reservoirs 36 and 37 under the control of a pedal 38 operating a metering device 39.

Pressure fluid derived from a reservoir 40 is normally supplied through a manually operated valve 41 to the pressure spaces 17 in the hydraulic actuators for the rear wheels to hold the springs 16 compressed.

If the supply of pressure fluid from either of the reservoirs 36 and 37 should fail the brakes on all four wheels can still be applied by pressure fluid from the other reservoir, while if the supplies from both of these reservoirs should fail opening of the valve 41 will relieve the pressure acting on the pistons 14 in the actuators for the rear wheel brakes and these will be applied by the springs 16 acting through the three pistons in the cylinders.

The valve 41 will also be opened to allow the rear wheel brakes to be applied by the springs 16 for parking.

As the shoes are separated at both ends in the application of the brake both shoes will act as leading shoes in both directions of rotation and whether the wedges are actuated hydraulically or by the springs. This allows the movement of the wedges in the application of the brake to be kept to a minimum.

Figure 5:
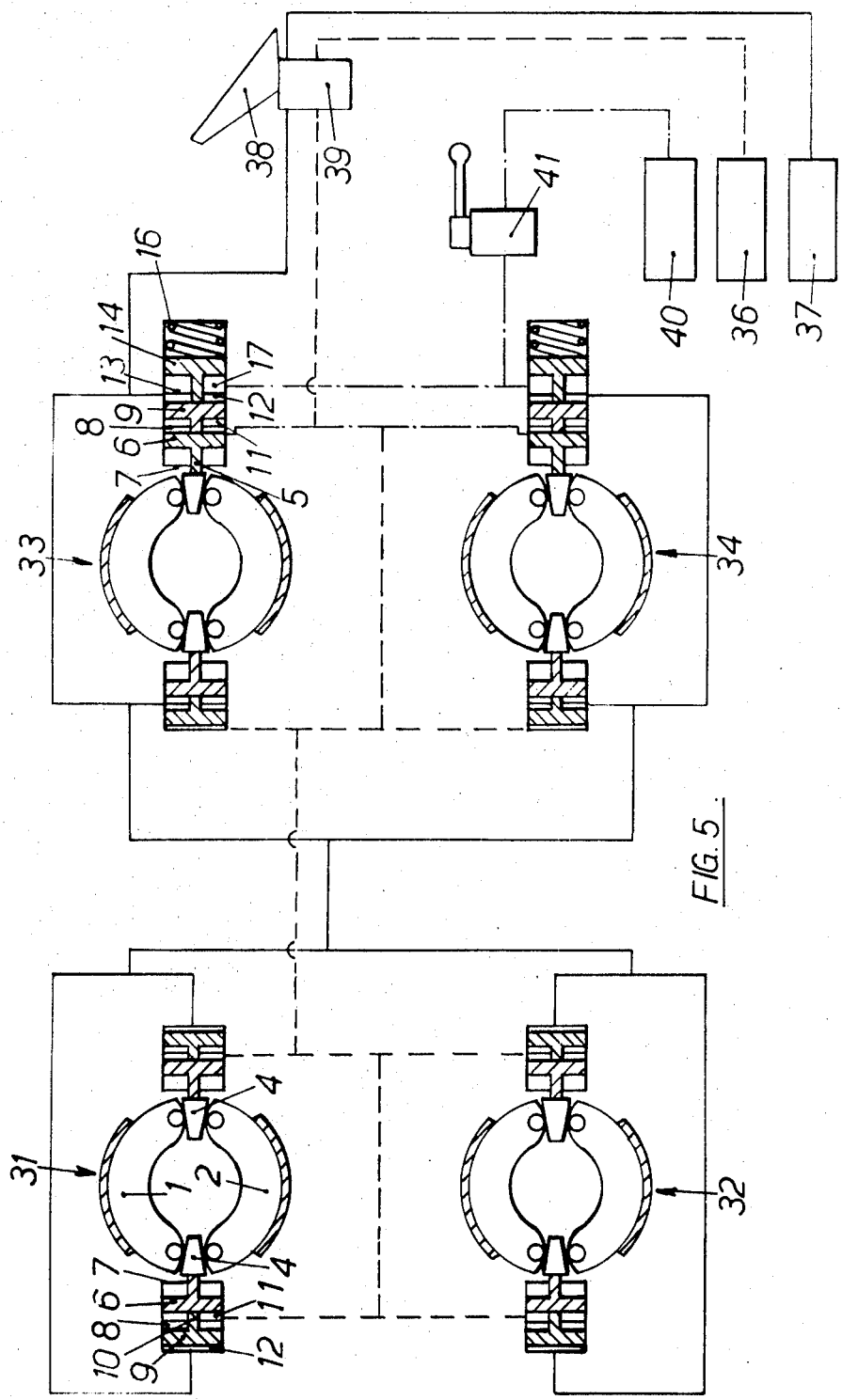
FIG. 5 is a layout of a complete braking system incorporating actuators for the brake shoes as shown in FIG. 3.

In the modification shown in FIG. 5 the separation of the shoes in the brakes on the rear wheels is effected at only one end by hydraulic cylinders incorporating spring-loaded pistons for parking and the shoes will act as leading and trailing shoes when applied for parking by opening the valve 41. The system is otherwise the same and the same reference numerals have been applied to corresponding parts.

FIG. 6 shows an hydraulic braking system in which the shoes 1, 2 of the brakes on all four wheels are separated at both ends by wedges 4 and hydraulic actuators as described above with reference to FIG. 3. The same reference numerals have been applied to corresponding parts of the actuators.

The spaces 26 and 28 in all the actuator cylinders are normally under fluid pressure supplied to the respective spaces from separate pressure reservoirs 47 and 48 through a manually operated valve 49. The springs 25 are thus held compressed and the brakes are held off.

The spaces 27 and 29 in the cylinders are connected to further separate pressure sources 50 and 51 through a foot-operated valve 52.

To apply the brakes the valve 52 is operated and this causes the spaces 26 and 28 in the cylinders to be exhausted to a reservoir at atmospheric pressure through diverter valves 53 and 54, and at the same time supplies pressure fluid from the sources 50 and 51 to the spaces 27 and 29 to actuate the wedges.

Operation of the valve 49 for parking or emergency braking connects the spaces 26 and 28 in the cylinders to exhaust so that the brakes are applied by the springs 25.

The use of two separate sources of pressure fluid for service braking and two other sources for parking or emergency braking ensures adequate safety in the system.

The sources of pressure fluid may be hydraulic accumulators which are kept charged to a constant pressure by a pump driven by the engine of the vehicle.

I claim:

1. A fluid-pressure-operated braking system for vehicles incorporating internal shoe-drum brakes wherein the brake shoes are separated at at least one end by a wedge actuated by a piston-rod carrying two axially spaced pistons working in a cylinder on opposite sides of a stationary partition in the cylinder through which the piston-rod passes and with which it is in sliding and sealing engagement, the piston-rod and piston assembly being loaded by a spring urging it inwardly in a direction to apply the said spring being located in said fourth space.

2. A braking system as in claim 5 wherein fluid pressure is normally maintained in the first and third spaces to urge the piston-rod and piston assembly outwardly against the action of the spring and retain it in that position, the supply of pressure fluid to the two spaces being derived from two separate sources under the control of a manually operated valve.

3. A braking system as in claim 1 wherein, for normal service braking, pressure fluid is supplied from two separate sources under the control of a foot-operated valve to the second and fourth spaces in the cylinder to urge the piston-rod and piston assembly inwardly to apply the brake, the first and third spaces being simultaneously exhausted to a reservoir at atmospheric pressure whereby the spring assists in the application of the brake.

4. A braking system as in claim 1 wherein, for parking or emergency braking, the first and third spaces in the cylinder are exhausted to a reservoir at atmospheric pressure by a manually operated valve whereby the piston-rod and piston assembly is urged inwardly by the spring to apply the brake and hold it applied until the first and third spaces are again pressurised.

* * * * *

UNITED STATES PATENT OFFICE
CERTIFICATE OF CORRECTION

Patent No. 3,777,857      Dated December 11, 1973

Inventor(s) Michael James Hughes

It is certified that error appears in the above-identified patent and that said Letters Patent are hereby corrected as shown below:

In Claim 1, line 10 (Col. 4, line 32) after "the" insert --brake, and means are provided for supplying fluid under pressure from separate sources to a first space in the cylinder between the inner piston and the inner end of the cylinder, to a second space between the inner piston and the partition, to a third space between the partition and the outer piston, and to a fourth space between the outer piston and the closed outer end of the cylinder, --

In Claim 2, line 1 (Col. 4, line 34) change "5" to --1--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*